United States Patent

Matsumoto et al.

(10) Patent No.: US 6,278,427 B1
(45) Date of Patent: Aug. 21, 2001

(54) ACTIVE MATRIX LIQUID-CRYSTAL DISPLAY DEVICE

(75) Inventors: Kimikazu Matsumoto; Shinichi Nishida; Hideo Shibahara, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/201,883

(22) Filed: Nov. 30, 1998

(30) Foreign Application Priority Data

Nov. 28, 1997 (JP) .................................................. 9-328678

(51) Int. Cl.[7] .................................................. G09G 3/36
(52) U.S. Cl. .................................. 345/88; 345/87; 345/94
(58) Field of Search .............................. 345/87, 88, 94; 349/141, 177, 178

(56) References Cited

U.S. PATENT DOCUMENTS

| | | | |
|---|---|---|---|
| 4,793,691 | * 12/1988 | Enomoto et al. | |
| 5,402,141 | * 3/1995 | Haim et al. | 345/88 |
| 5,831,701 | * 11/1998 | Matsuyama et al. | 349/110 |
| 5,870,160 | * 2/1999 | Yanagawa et al. | 349/141 |
| 6,108,066 | * 8/2000 | Yanagawa et al. | 349/141 |

FOREIGN PATENT DOCUMENTS

| | | |
|---|---|---|
| 2-211402 | 8/1990 | (JP) . |
| 9-5763 | 1/1997 | (JP) . |

* cited by examiner

*Primary Examiner*—Almis R. Jankus
*Assistant Examiner*—Henry N. Tran
(74) *Attorney, Agent, or Firm*—Sughrue, Mion, Zinn, Macpeak & Seas, PLLC

(57) ABSTRACT

Disclosed is an active matrix liquid-crystal display device, which has: an electrode-formed substrate which is composed of a drain signal electrode, a gate signal electrode, a pixel electrode and a common electrode to compose a pixel unit, and an active element; a color-filter-formed substrate where no electrode is formed and a color filter layer of red (R), green (G) and blue (B) to color light transmitted therethrough is formed; and a liquid-crystal layer sandwiched between the electrode-formed substrate and the color-filter-formed substrate; wherein the fieldthrough of respective color layers (R, G, B) of the color filter layer is equalized.

2 Claims, 8 Drawing Sheets

$(H_{RED}) \cdot (\varepsilon_{RED}) = (H_{GREEN}) \cdot (\varepsilon_{GREEN}) = (H_{BLUE}) \cdot (\varepsilon_{BLUE})$

ACTIVE MATRIX LIQUID-CRYSTAL DISPLAY DEVICE

FIELD OF THE INVENTION

This invention relates to an active matrix liquid-crystal display device intended to prevent the image-sticking defect that a residual image occurs when displaying another image after displaying the same image for a long time.

BACKGROUND OF THE INVENTION

Recently, an IPS (in-plane switching) mode (or horizontal electric field drive type) liquid-crystal display device, whose displaying is conducted by rotating the molecular axis direction (hereinafter referred to as 'director') of oriented liquid-crystal (hereinafter also referred to as 'LC') molecule in parallel direction to the substrate, has been researched and developed.

Such an IPS-mode LC display device does not have view-angle dependency to 'standing direction' of LC molecule because only the short-axis direction is constantly viewed even when shifting its viewpoint. Therefore, it can obtain a wide view angle, compared with an LC display device, such as conventional TN (twist nematic) mode, where electric field is generated in the perpendicular direction of substrates to sandwich an LC layer between the substrates (hereinafter referred to as 'vertical electric field drive type).

In the research and development of the IPS-mode LC display device, various techniques developed in the vertical electric field drive type devices are diverted and applied. However, the techniques of vertical electric field drive type devices cannot be unalteredly diverted thereto, particularly, as to view-angle characteristics and reliability, by the following reasons.

For example, with reference to normally-black LC display device, the comparison between TN mode as an example of the vertical electric field drive type and IPS mode intended for this invention will be explained.

In TN mode, directors are generally twisted by 90° between two substrates in zero field, but they are existing in a plane parallel to the plane of substrate, like the case of IPS mode. However, in applying electric field, all directors are normally oriented in a plane parallel to the surface of substrate in IPS mode whereas all directors are normally oriented perpendicularly to the surface of substrate in TN mode.

Therefore, in IPS mode, the display appears to be white even when viewing from any viewpoint, but, in TN mode, it appears to be white or gray, as neutral color, depending on the viewing directions due to the refractive-index difference between the short axis and long axis of LC molecule. As understood from this, IPS mode and TN mode have no view-angle characteristic obtained resultantly in common, due to the difference in driving system.

Also, with respect to unit pixel composition, in TN mode, electrodes to compose a pixel are formed on two substrates, respectively because the electric field is generated perpendicularly to the plane of substrate, but, in IPS mode, all electrodes to compose a pixel are formed only on one substrate because the electric field is generated parallel to the plane of substrate. Namely, in TN mode, electric flux line to drive LC does not penetrate through the color layer of color filter, but, in IPS mode, electric flux line to drive LC penetrates through the color layer of color filter. Viewing from this, it is obvious that the degree of the influence of color layer of color filter to LC panel characteristics is different between TN mode and IPS mode.

From the differences described above, it is evident that the conventional techniques of TN cannot be unalteredly diverted to IPS.

FIGS. 1 and 2 are a cross sectional view and a top view, respectively, showing illustratively the basic composition of a conventional active matrix LC display device using horizontal electric field driving. Referring to FIG. 1, in this conventional LC display device, electrodes to compose a pixel electrode are formed only on one substrate 112 of two substrates sandwiching an LC layer 101 confined, on an opposing substrate 102 no electrode is formed and only a color filter to color light transmitted therethrough is formed.

Namely, on the electrode-forming substrate 112, one active element (not shown in FIG. 1), one drain signal electrode 103, one gate signal electrode (not shown in FIG. 1), and pairs of pixel electrodes (pixel electrodes 104 and common electrodes 105) are disposed in unit pixel. All formed on the color filter forming substrate 102 are color filter layers (Red 109, Green 110, Blue 111) to color light transmitted through LC into a specific color, generally red, green or blue, and a black matrix layer 108 to shield leakage light from the neighborhood of the drain signal electrode 103 on the electrode-forming substrate 112 or the gate signal electrode.

The color layers (R, G, B) 109, 110, 111 are formed considering the color purity and chromaticity level of light transmitted through panel. The color layers (R, G, B) 109, 110, 111 are produced by coloring an organic polymer material, such as polyvinyl alcohol or acryl resin, by using a dyestuff or pigment. Therefore, when producing it by, e.g., pigment scattering, the dielectric constants of the color layers (R, G, B) 109, 110, 111 vary, depending on the kind of pigment or the scattering density. Though the thickness H of color layer is set to be greater than 1 μm so as to enhance the color purity, the respective thicknesses of the color layers (R, G, B) 109, 110, 111 are also different each other because the respective transmissivities of the color layers (R, G, B) 109, 110, 111 are different each other. Accordingly, the color-layer static capacitance of color layer represented by the product of color-layer dielectric constant and color-layer thickness H is not constant in the color layers (R, G, B) 109, 110, 111 each.

In the arrangement of respective electrodes within unit pixel, the common electrode 105 is located just nearby the drain signal electrode 103, the pixel electrodes 104 are disposed at certain intervals, the common electrode 105 and pixel electrode 104 are alternately disposed at equal intervals or unequal intervals, the common electrode 105 is further located in a layer covered with interlayer insulating film 106 nearby the substrate, different from the scanning signal electrode 103 and pixel electrode 104 (the common electrode 105 and pixel electrode 104 each are located in the separate layer).

Also, the active matrix LC display device uses AC drive to prevent the deterioration of panel members such as LC. For example, the polarity of signal is inverted every one field with a reference level (opposing electrode's level) at the center.

Also, in the active matrix LC display device, a drain voltage applied when the TFT element is turned on shifts by $V_P$ in the minus-potential direction of gate voltage when the TFT element is turned off, thereby causing a certain amount of potential fall. Namely, being up and down asymmetrical to the reference level and opposing electrode's level, resultantly $V_P$ (hereinafter referred to as 'fieldthrough') is applied to the LC drive voltage as a DC component. When the DC component is applied to the LC drive voltage, the accumulation of charge occurs, therefore causing an image-sticking defect etc.

Such a phenomenon that the DC component is applied to the LC drive voltage may occur in TN type where electric field is applied perpendicularly to the substrate. Its solution is disclosed in Japanese patent application laid-open No. 61-116392 (1986).

In this application, it is proposed that DC voltage applied to LC is corrected by adding a predetermined potential difference ($V_T$) to a reference level of AC drive signal. Namely, $V_P$-$V_T$ is given to be up and down symmetrical to the reference level.

However, LC capacitance $C_{LC}$, which varies due to the orientation state of LC (degree of inclination of LC molecule to pixel electrode), generally differs in each pixel. The relationship between this capacitance $C_{LC}$ and a potential fall different $\Delta V_P$ of LC charging voltage when gate voltage is turned off is given by expression 1, which is reported by T. Yanagisawa et al., "Japan Display '86", p. 192:

$$\Delta V_P = -\frac{C_{GS}}{C_{GS} + C_{LC}} \cdot (V_{ON} - V_{OFF}) \quad [1]$$

In this regard, Japanese patent application laid-open No. 5-72997 (1993) describes that the image-sticking defect becomes most unlikely to happen by setting $C_{LC}$ of B, a minimum capacitance value when the amplitude of LC drive voltage is small, i.e., when LC is oriented parallel to pixel electrode. This is because the accumulation of charge added to drive voltage by DC component becomes large as the drain voltage increases.

Meanwhile, the fieldthrough is caused by parasitic capacitance $C_{GS}$ between gate and source of TFT element, and by that the respective charges accumulated in LC capacitance, $C_{LC}$ and accumulation capacitance $C_{GS}$ when the gate pulse becomes ON are redistributed to the respective capacitance when the gate pulse becomes OFF. In TN type, on the side of opposing electrode a transparent electrode (opposing electrode) is formed on the color layer, therefore electric field generated by the pixel electrode and opposing electrode does not penetrate through the inside of the color layer and the color layer itself is polarized. Therefore, as shown in expression 1, the item of color layer is not included in the fieldthrough $\Delta V_P$.

In contrast with this, in horizontal electric field drive type, the transparent electrode on the color filter forming substrate in TN type does not exist, therefore the electric flux line generated by the pixel electrode and common electrode penetrates through the inside of the color layer. Namely, the fieldthrough $\Delta V_P$ is a function of color-layer capacitance $C_{COLOR}$, which is given by:

$$\Delta V_P = -\frac{C_{GS}}{C_{GS} + C_{LC} + C_{COLOR}} \cdot (V_{ON} - V_{OFF}) \quad [2]$$

Also, the color layers (R, G, B) of color filter are formed considering the color purity and chromaticity level of light transmitted through panel. The color layers (R, G, B) are produced by coloring an organic polymer material, such as polyvinyl alcohol or acryl resin, by using a dyestuff or pigment. Therefore, when producing it by, e.g., pigment scattering, the dielectric constants of the color layers (R, G, B) vary, depending on the kind of pigment or the scattering density. Though the thickness H of color layer is set to be greater than 1 $\mu$m so as to enhance the color purity, the respective thicknesses of the color layers (R, G, B) are also different each other because the respective transmissivities of the color layers (R, G, B) are different each other. Accordingly, the color-layer static capacitance represented by the product of color-layer dielectric constant and color-layer thickness H is not constant in the color layers (R, G, B) each.

When a same voltage is applied to the color layers (R, G, B) with such characteristics, the fieldthrough $\Delta V_P$ results in differing in the color layers (R, G, B) each because the LC static capacitance and the static capacitance of the color layers (R, G, B) are different each other. Namely, different DC components are applied to LC as to the color layers (R, G, B) each, the accumulation of charge occurs within the panel, thereby causing the image-sticking defect that a residual image occurs when displaying another image after displaying the same image for a long time.

On the other hand, Japanese patent application laid-open No. 2-211402 (1990) discloses a technique the thickness and dielectric constant of color layers (R, G, B). This is devised to get correspondence in optical response of the color layers (R, G, B) each, and relates to TN type where the color layer is formed on the transparent electrode. Therefore, its electrode structure and application of electric field are clearly different from those of this invention.

As described above, in the conventional techniques, there is the problem that different DC components are added to LC drive voltage as to the color layers (R, G, B) each, thereby causing the image-sticking defect. This is caused directly by that, in the horizontal electric field drive type active matrix LC display device, electric flux line to drive LC penetrates through the inside of the color layers (R, G, B) because the transparent electrode does not exist on the color filter forming substrate, and that the color layer itself is therefore polarized due to the difference in sum of color-layer static capacitance and LC static capacitance.

SUMMARY OF THE INVENTION

Accordingly, it is an object of the invention to provide an active matrix liquid-crystal display device by which the image-sticking defect that a residual image occurs when displaying another image after displaying the same image for a long time can be effectively prevented.

According to the invention, an active matrix liquid-crystal display device, comprises:

an electrode-formed substrate which is composed of a drain signal electrode, a gate signal electrode, a pixel electrode and a common electrode to compose a pixel unit, and an active element;

a color-filter-formed substrate where no electrode is formed and a color filter layer of red (R), green (G) and blue (B) to color light transmitted therethrough is formed; and a liquid-crystal layer sandwiched between the electrode-formed substrate and the color-filter-formed substrate;

wherein a plurality of the pixel electrode and the common electrode on the electrode-formed substrate each are in unit pixel, and disposed parallel at predetermined intervals and alternately in a same layer or through insulating film, electric field substantially parallel to the electrode-formed substrate and the color-filter-formed substrate is applied to the liquid-crystal layer by applying an alternating-current voltage between the pixel electrode and the common electrode, the pixel electrode and the common electrode are connected to an external control means by which the applied electric field is arbitrarily controlled according to a display pattern, two orientation films print-coated are formed directly or through insulating film on the electrode-formed substrate and the color-filter-formed substrate, respectively, the two orientation films are disposed opposite each other and with a predetermined clearance by a panel spacer, nematic liquid crystal is filled into the clearance while being anti-parallel oriented, and fieldthrough of respective color layers (R, G, B) of the color filter layer is equalized.

According to another aspect of the invention, an active matrix liquid-crystal display device, comprises:

an electrode-formed substrate which is composed of a drain signal electrode, a gate signal electrode, a pixel electrode and a common electrode to compose a pixel unit, and an active element;

a color-filter-formed substrate where no electrode is formed and a color filter layer of red (R), green (G) and blue (B) to color light transmitted therethrough is formed; and a liquid-crystal layer sandwiched between the electrode-formed substrate and the color-filter-formed substrate;

wherein a plurality of the pixel electrode and the common electrode on the electrode-formed substrate each are in unit pixel, and disposed parallel at predetermined intervals and alternately in a same layer or through insulating film, electric field substantially parallel to the electrode-formed substrate and the color-filter-formed substrate is applied to the liquid-crystal layer by applying an alternating-current voltage between the pixel electrode and the common electrode, the pixel electrode and the common electrode are connected to an external control means by which the applied electric field is arbitrarily controlled according to a display pattern, two orientation films print-coated are formed directly or through insulating film on the electrode-formed substrate and the color-filter-formed substrate, respectively, the two orientation films are disposed opposite each other and with a predetermined clearance by a panel spacer, nematic liquid crystal is filled into the clearance while being anti-parallel oriented, and the product $\epsilon \times H$ of the dielectric constant $\epsilon$ and thickness H of respective color layers (R, G, B) of the color filter layer is equalized.

According to another aspect of the invention, an active matrix liquid-crystal display device, comprises:

an electrode-formed substrate which is composed of a drain signal electrode, a gate signal electrode, a pixel electrode and a common electrode to compose a pixel unit, and an active element;

a color-filter-formed substrate where no electrode is formed and a color filter layer of red (R), green (G) and blue (B) to color light transmitted therethrough is formed; and a liquid-crystal layer sandwiched between the electrode-formed substrate and the color-filter-formed substrate;

wherein a plurality of the pixel electrode and the common electrode on the electrode-formed substrate each are in unit pixel, and disposed parallel at predetermined intervals and alternately in a same layer or through insulating film, electric field substantially parallel to the electrode-formed substrate and the color-filter-formed substrate is applied to the liquid-crystal layer by applying an alternating-current voltage between the pixel electrode and the common electrode, the pixel electrode and the common electrode are connected to an external control means by which the applied electric field is arbitrarily controlled according to a display pattern, two orientation films print-coated are formed directly or through insulating film on the electrode-formed substrate and the color-filter-formed substrate, respectively, the two orientation films are disposed opposite each other and with a predetermined clearance by a panel spacer, nematic liquid crystal is filled into the clearance while being anti-parallel oriented, and the active-element-side holding capacitance is varied to each of the color layers so as to compensate a difference in the sum of color-layer capacitance and liquid-crystal capacitance at each of the color layers (R, G, B) in the color filter.

According to another aspect of the invention, an active matrix liquid-crystal display device, comprises:

an electrode-formed substrate which is composed of a drain signal electrode, a gate signal electrode, a pixel electrode and a common electrode to compose a pixel unit, and an active element;

a color-filter-formed substrate where no electrode is formed and a color filter layer of red (R), green (G) and blue (B) to color light transmitted therethrough is formed; and a liquid-crystal layer sandwiched between the electrode-formed substrate and the color-filter-formed substrate;

wherein a plurality of the pixel electrode and the common electrode on the electrode-formed substrate each are in unit pixel, and disposed parallel at predetermined intervals and alternately in a same layer or through insulating film, electric field substantially parallel to the electrode-formed substrate and the color-filter-formed substrate is applied to the liquid-crystal layer by applying an alternating-current voltage between the pixel electrode and the common electrode, the pixel electrode and the common electrode are connected to an external control means by which the applied electric field is arbitrarily controlled according to a display pattern, two orientation films print-coated are formed directly or through insulating film on the electrode-formed substrate and the color-filter-formed substrate, respectively, the two orientation films are disposed opposite each other and with a predetermined clearance by a panel spacer, nematic liquid crystal is filled into the clearance while being anti-parallel oriented, and a circuit to send electrical signal to each of the color layers (R, G, B) in the color filter is provided to make a difference in the central value of drain signal voltages for the respective color layers.

According to another aspect of the invention, an active matrix liquid-crystal display device, comprises:

an electrode-formed substrate which is composed of a drain signal electrode, a gate signal electrode, a pixel electrode and a common electrode to compose a pixel unit, and an active element;

a color-filter-formed substrate where no electrode is formed and a color filter layer of red (R), green (G) and blue (B) to color light transmitted therethrough is formed; and a liquid-crystal layer sandwiched between the electrode-formed substrate and the color-filter-formed substrate;

wherein a plurality of the pixel electrode and the common electrode on the electrode-formed substrate each are in unit pixel, and disposed parallel at predetermined intervals and alternately in a same layer or through insulating film, electric field substantially parallel to the electrode-formed substrate and the color-filter-formed substrate is applied to the liquid-crystal layer by applying an alternating-current voltage between the pixel electrode and the common electrode, the pixel electrode and the common electrode are connected to an external control means by which the applied electric field is arbitrarily controlled according to a display pattern, two orientation films print-coated are formed directly or through insulating film on the electrode-formed substrate and the color-filter-formed substrate, respectively, the two orientation films are disposed opposite each other and with a predetermined clearance by a panel spacer, nematic liquid crystal is filled into the clearance while being anti-parallel oriented, and a circuit to send electrical signal to each of the color layers (R, G, B) in the color filter is provided to make a difference in the amplitude of drain signal voltages for the respective color layers.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
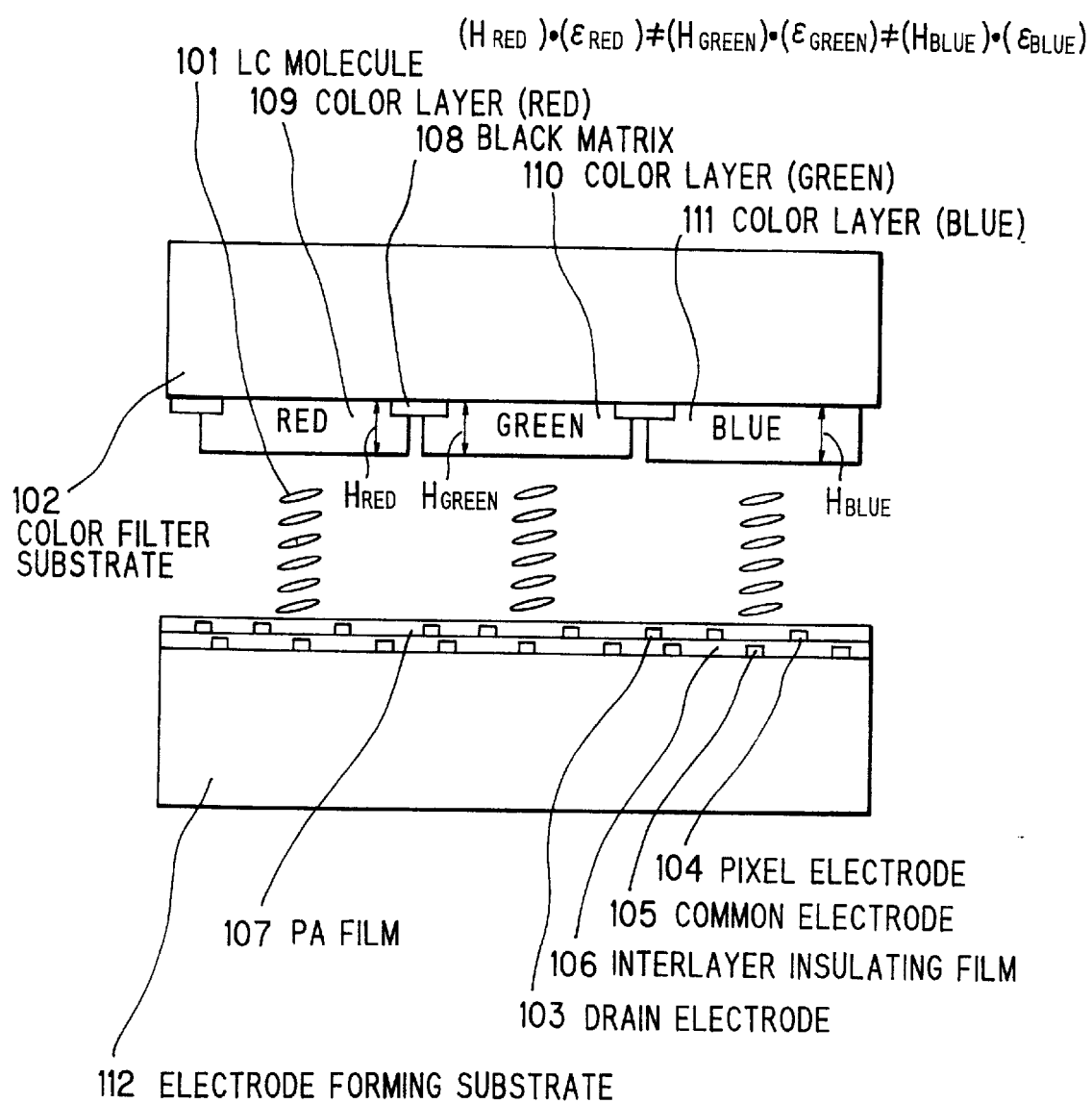
FIG. 1 is a cross sectional view showing the conventional horizontal electric field drive type liquid-crystal display device.
Figure 2:
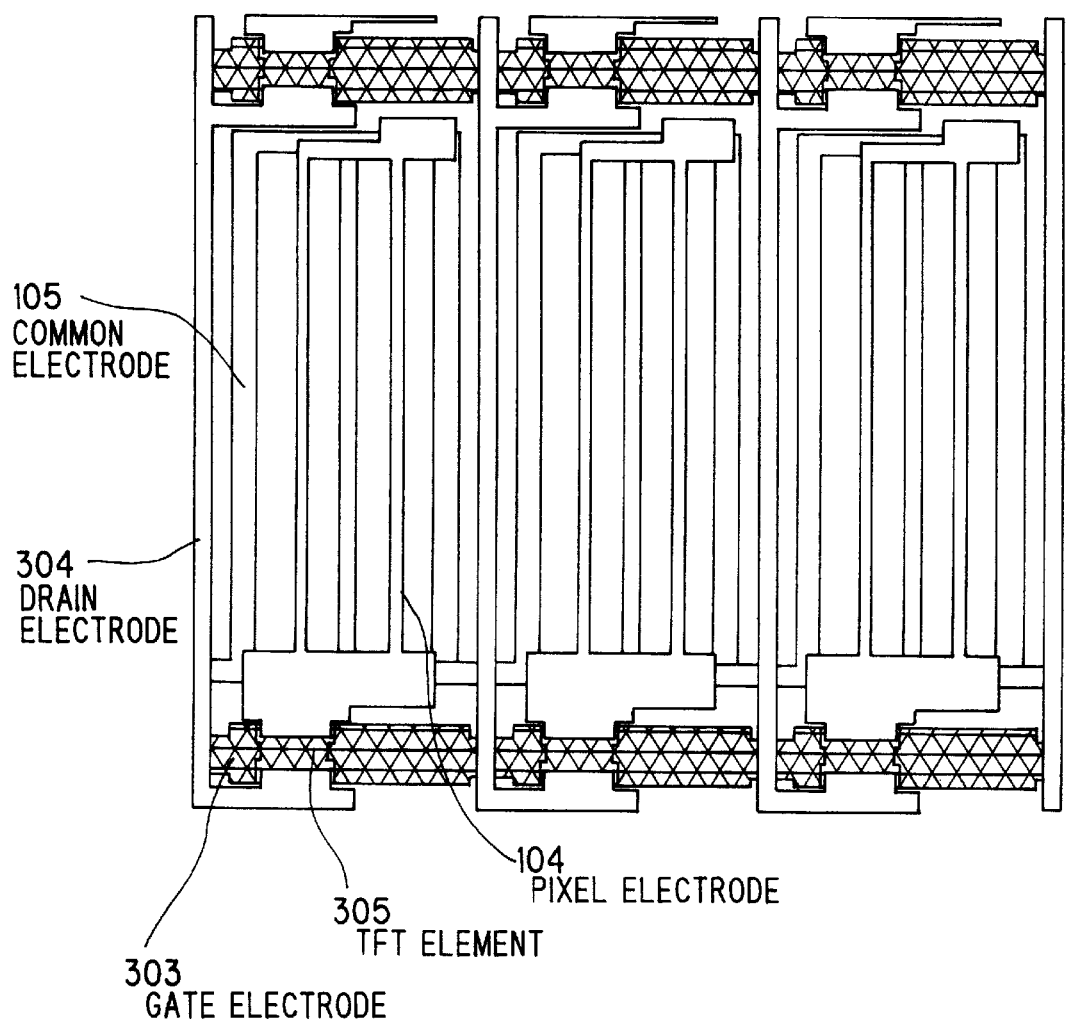
FIG. 2 is a top view showing the conventional horizontal electric field drive type liquid-crystal display device.

The preferred embodiments of this invention will be explained below, referring to the drawings.

Figure 3:
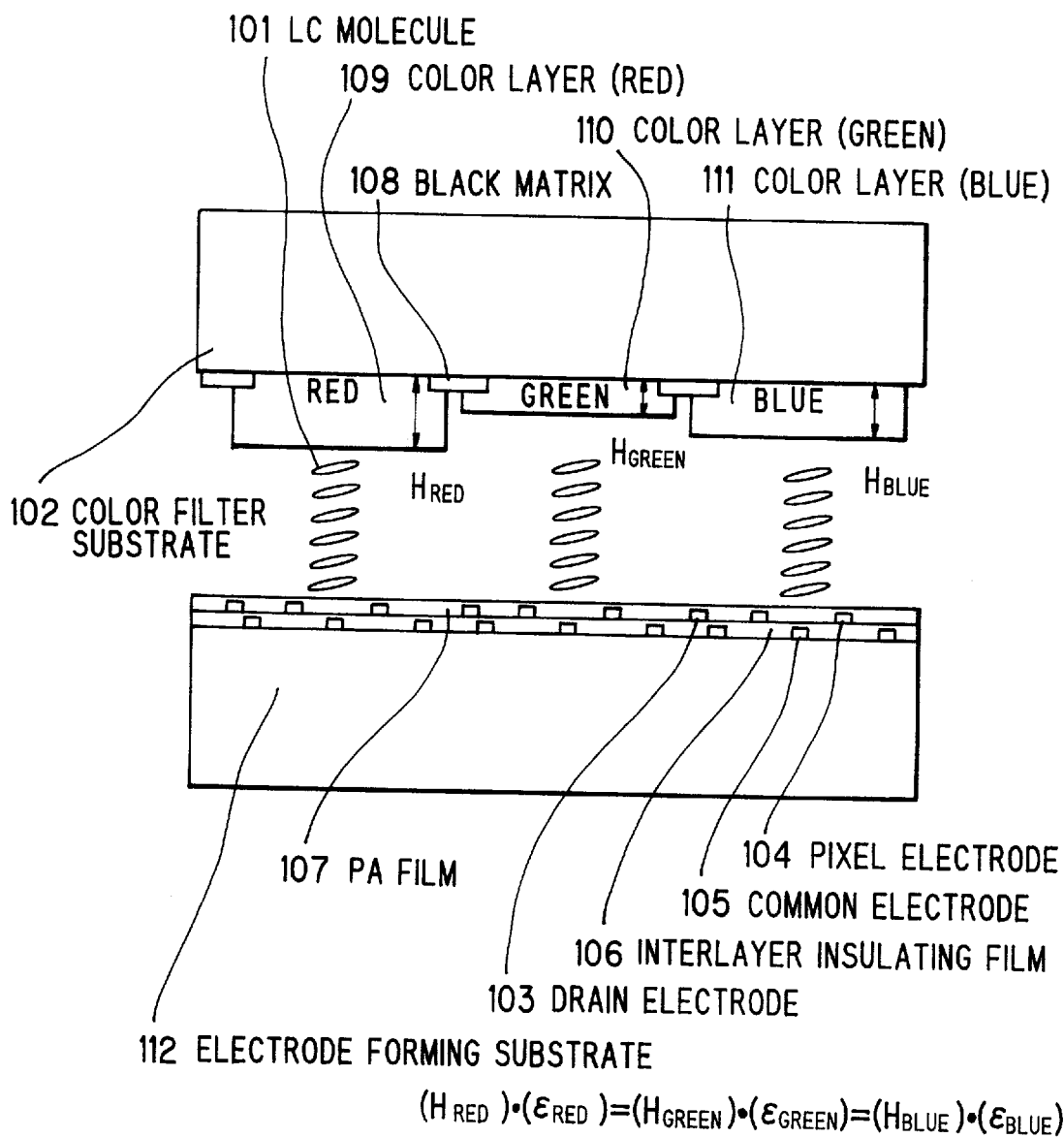
FIG. 3 is a cross sectional view showing an active matrix liquid-crystal display device in a first preferred embodiment according to the invention where (color-layer static capacitance+LC static capacitance) is equalized in the respective color layers of a color filter.

In a horizontal electric field drive type active matrix LC display device in the first preferred embodiment of the invention, as shown in FIG. 3, electrodes to compose a pixel electrode are formed only on one substrate 112 of two substrates sandwiching an LC layer 101 confined, on an opposing substrate 102 no electrode is formed and only a color filter to color light transmitted therethrough is formed.

Namely, as shown in FIG. 3, on the electrode-forming substrate 112, one active element (TFT element) (not shown in FIG. 3), one drain signal electrode 103, one gate signal electrode (not shown in FIG. 3), and pairs of pixel electrodes (pixel electrodes 104 and common electrodes 105) are disposed in unit pixel. All formed on the color filter forming substrate 102 are color filter layers (Red 109, Green 101, Blue 111) to color light transmitted through LC into a specific color, generally red, green or blue, and a black matrix layer 108 to shield leakage light from the neighborhood of the drain signal electrode 103 on the electrode-forming substrate 112 or the gate signal electrode.

In the arrangement of respective electrodes within unit pixel, the common electrode 105 is located just nearby the drain signal electrode 103, the pixel electrodes 104 are disposed at certain intervals, the common electrode 105 and pixel electrode 104 are alternately disposed at equal intervals or unequal intervals, the common electrode 105 is further located in a layer covered with interlayer insulating film 106 nearby the substrate, different from the scanning signal electrode 103 and pixel electrode 104 (the common electrode 105 and pixel electrode 104 each are located in the separate layer).

Also, in order to equalize the sum of the static capacitance of the color layers (R, G, B) 109, 110, 111 and the static capacitance of LC, the color-layer static capacitance in the color layers (R, G, B) 109, 110, 111 each is made to be constant by equalize the product of dielectric constant $\epsilon$ and thickness H in each of the color layers (R, G, B) 109, 110, 111 formed on the color filter forming substrate 102, i.e., by effecting the relation of: $\epsilon(RED) \times H(RED) = \epsilon(GREEN) \times H(GREEN) = \epsilon(BLUE) \times H(BLUE) = A$.

Figure 4:
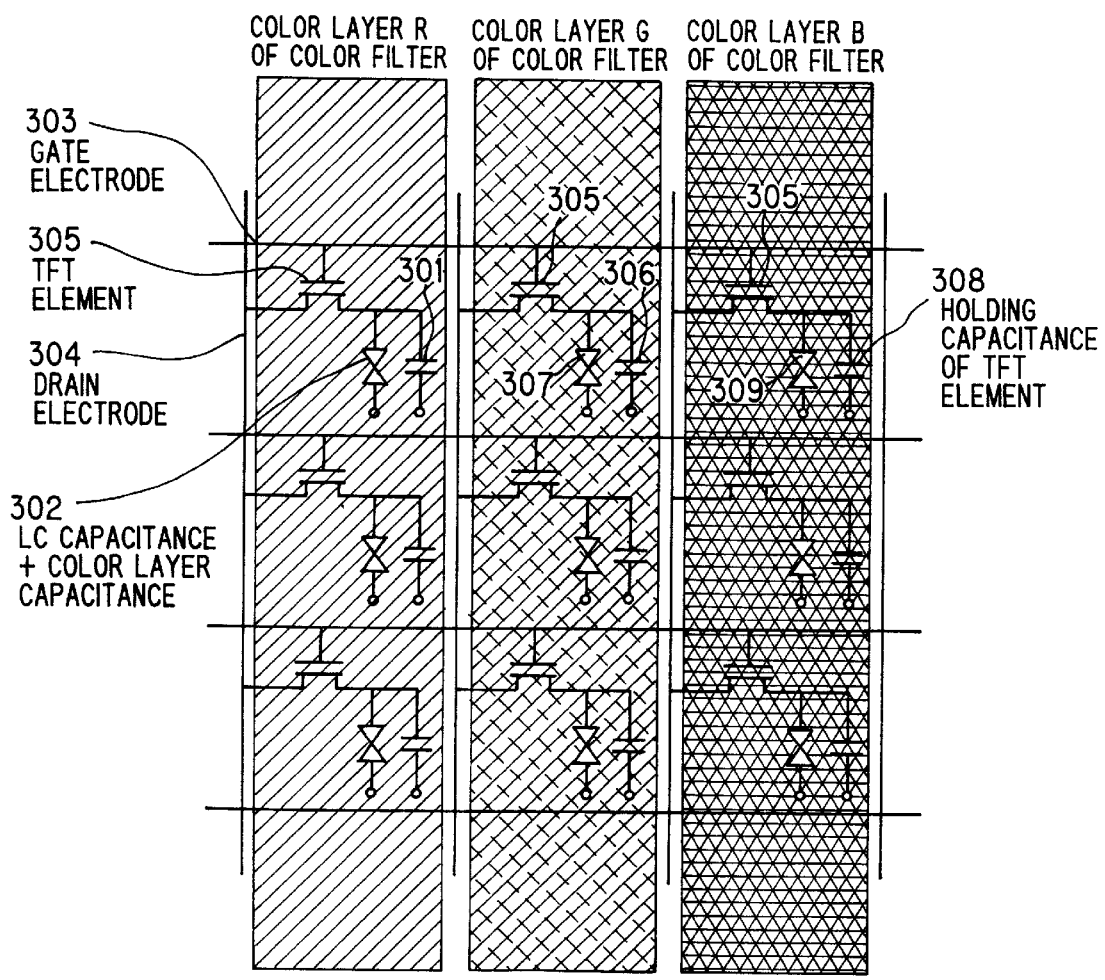
FIG. 4 is a circuit diagram showing an equivalent circuit in an active matrix liquid-crystal display device in a second preferred embodiment according to the invention where TFT-side holding capacitance is varied at each of color layers so as to compensate a difference in the sum of color-layer capacitance and LC capacitance at each of the color layers of a color filter.

Therefore, by inputting a drain signal common to the color layers (R, G, B) 109, 110, 111 as shown in FIG. 4, the fieldthrough $\Delta V_P$ occurred can be equal at each of the color layers (R, G, B) 109, 110, 111, thereby preventing the image-sticking defect.

In the second preferred embodiment of the invention, the holding capacitance of TFT element 305 is varied. The holding capacitance means a capacitance line for the overlapping or capacitance-holding between the pixel electrode 104 and gate electrode. FIG. 4 is an equivalent circuit of horizontal electric field drive type panel. The fieldthrough $\Delta V_P$ of each of the color layer (R, G, B) 109, 110, 111 is made to be constant by varying holding capacitance's 301, 306, 308 according to differences of static capacitance among the color layers (R, G, B) 109, 110, 111 while leaving the color-layer static capacitance of the color layers (R, G, B) 109, 110, 111 each different. Thereby the image-sticking defect can be prevented. Meanwhile, 302 is (LC capacitance $C_{LC}$+ red-layer capacitance $C_R$), 307 is (LC capacitance $C_{LC}$+ green-layer capacitance $C_G$), 309 is (LC capacitance $C_{LC}$+ blue-layer capacitance $C_B$).

Figure 5:
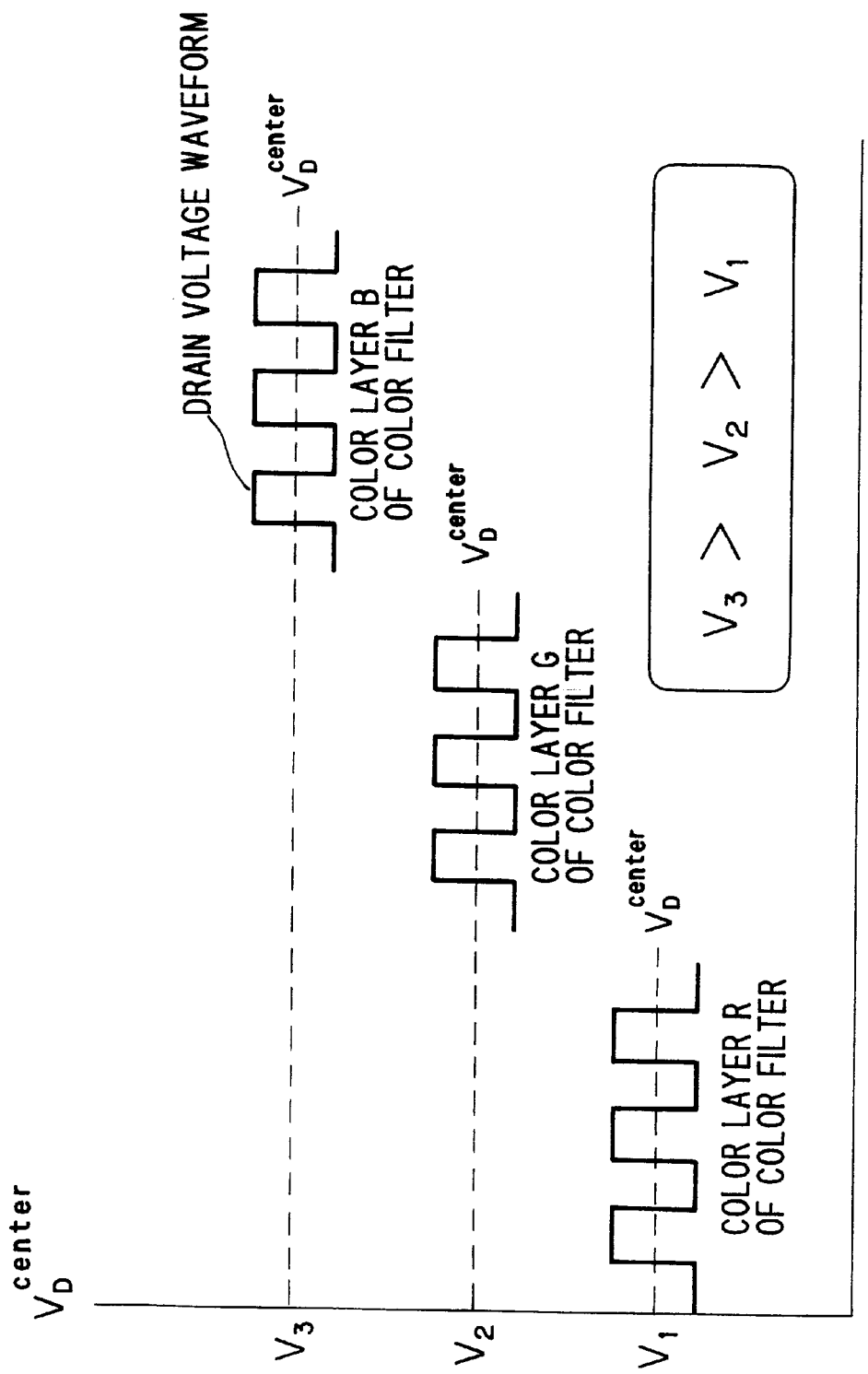
FIG. 5 is an illustrative diagram showing an example of different central values of drain voltage input to each of the color layers of a color filter in a third preferred embodiment according to the invention.

In the third preferred embodiment of the invention, the central value of drain voltage differs among the color layers (R, G, B) 109, 110, 111. FIG. 5 is an illustrative diagram showing kinds of color layer along the abscissa axis and central values $V_D$ of drain voltage to be input to the respective color layers (R, G, B) 109, 110, 111 along the ordinate axis. In this embodiment, the fieldthrough $\Delta V_P$ is corrected by means of drive voltage, while leaving the color-layer static capacitance of the color layers (R, G, B) 109, 110, 111 each different and without changing the holding capacitance's 301, 306, 308 of TFT element 305.

Namely, the central values $V_D$ of drain voltage are shifted by different fieldthrough $\Delta V_P$ generated at the respective color layers (R, G, B) 109, 110, 111. Thereby the image-sticking defect can be prevented.

In the fourth preferred embodiment of the invention, the amplitude of drain voltage differs among the color layers (R, G, B) 109, 110, 111. In this embodiment, the fieldthrough $\Delta V_P$ is corrected by means of drive voltage, while leaving the color-layer static capacitance of the color layers (R, G, B) 109, 110, 111 each different and without changing the holding capacitance's 301, 306, 308 of TFT element 305. Namely, the amplitudes of drain voltage are shifted by different fieldthrough $\Delta V_P$ generated at the respective color layers (R, G, B) 109, 110, 111. Thereby the image-sticking defect can be prevented.

Next, the above embodiments of the invention will be detailed with specific values as to its composition and structure.

FIG. 3 is a cross sectional view illustratively showing the panel in the embodiments of the invention. In principal part of the process of making the LC display device, particularly, the color filter, patterning polyimide with ultraviolet-sensitive group where less than 1 μpigment of red, green or blue is well dispersed and mixed by using photolithography, then baking it at 230° C. for one hour, the color filter layers, i.e., the color layers (R, G, B) 109, 110, 111 are formed on no-alkali glass substrate 102.

The resistivity of the respective color layers (R, G, B) 109, 110, 111 in the embodiments of the invention is nearly constant, of 0.85 to $1.6 \times 10^{11}$ (Ωcm), and their specific dielectric constants ε are R=3.4, G=3.6 and B=4.2. The thickness H of the color layers (R, G, B) 109, 110, 111 each is made to be greater than 1.0 μm to obtain a sufficient color purity. Samples each differing by 0.1 μm in the range of color-layer film thickness level shown in Table 1 are prepared.

The specific samples are of R=1.5 μm, G=1.4 to 1.5 μm, B=1.2 to 1.5 μm. Also, according to need, inorganic or organic transparent protective film is formed on the respective color layers (R, G, B) 109, 110, 111 so as to flatten the gap and enhance the etching characteristic.

TABLE 1

| Color layer | ε | H [μm] | Color · layer static capacitance [ε] · [H] |
|---|---|---|---|
| R | 3.4 | 1.5 | 5.10 |
| G | 3.6 | 1.4 to 1.7 | 5.04 to 6.12 |
| B | 4.2 | 1.2 to 1.5 | 5.04 to 6.30 |

The opposing substrate (color layer forming substrate) on which the color filter made as above-mentioned is formed and the electrode forming substrate on which the active matrix element is formed are coated with orientation film, then the rubbing is conducted in 15°-inclined direction to the longitudinal direction of electrode. In this process, the rubbing density as rubbing strength is controlled to be about 150 cm. Then, spraying spacer to get a constant cell thickness, bonding both the substrates, filling LC into the clearance, thereby the active matrix LC display panel is formed.

Figure 6:
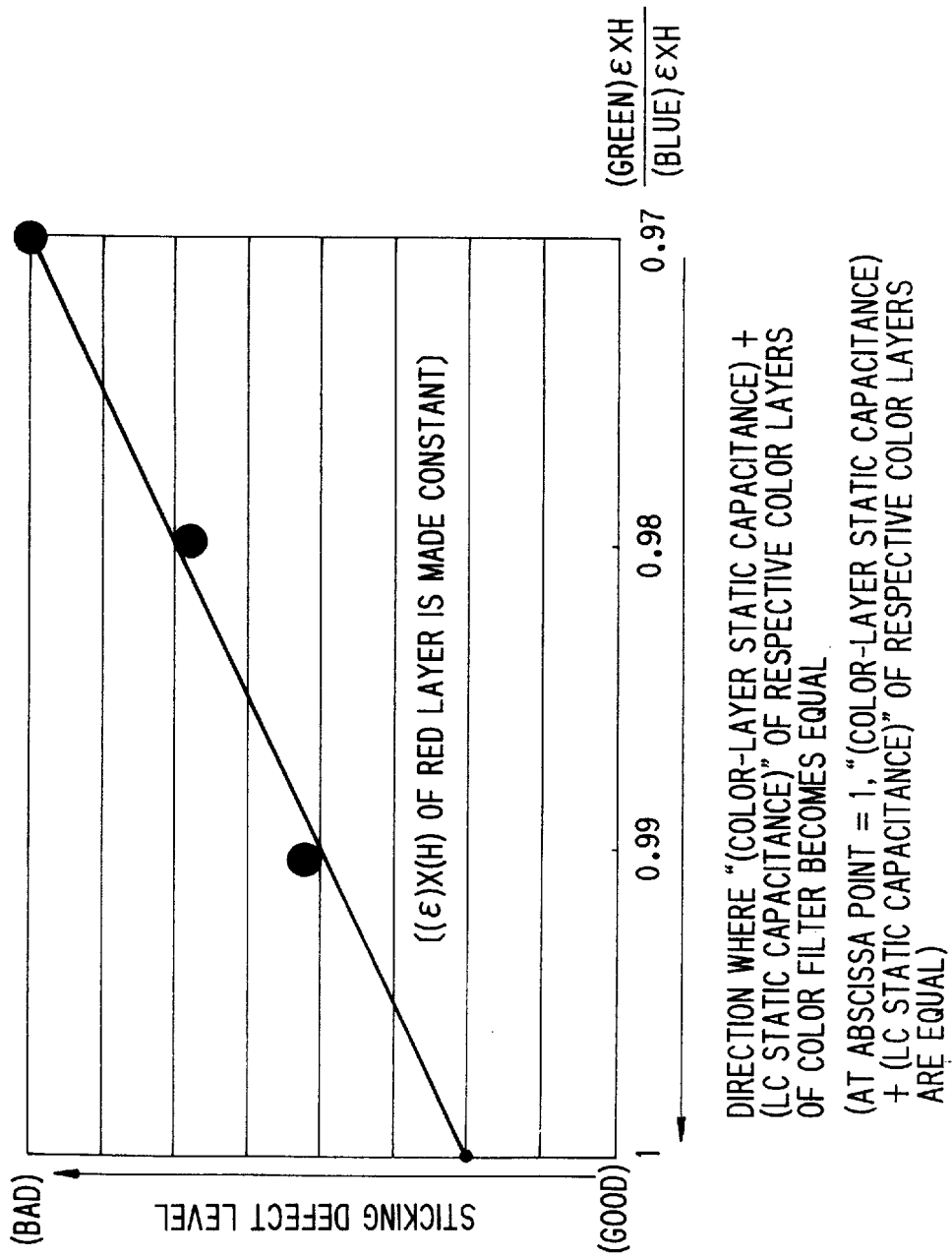
FIG. 6 is a graph showing the relationship between ($\epsilon$)×(H) of respective color layers and image-sticking defect in the first embodiment.

The thus-made active matrix LC display panels with composition elements of 640×480×RGB where, as shown in Table 1, the thickness of the respective color layers (R, G, B) 109, 110, 111 is varied are rendered to the image-sticking defect test, where in this electro-optic device a checker-flag pattern to alternately display white-display part and black-display part is displayed for a certain time and then changed into halftone display. The test results are as shown in FIG. 6. When the product of color-layer specific dielectric constant ε and color-layer thickness H is equal in all the color layers (R, G, B) 109, 110, 111, the image-sticking defect can be prevented.

Namely, this is when ε(RED)×H(RED)=ε(GREEN)×H(GREEN)=ε(BLUE)×H(BLUE)=A is satisfied. In the first embodiment, A=5.10 [μm] is obtained.

Also in the second embodiment where the holding capacitance's 301, 306, 308 are varied to the color layers (R, G, B) 109, 110, 111, respectively, to equalize the fieldthrough $\Delta V_P$ generated at the respective color layers (R, G, B) 109, 110, 111 is apparently effective.

Though the first and second embodiments use the techniques to equalize the fieldthrough $\Delta V_P$ generated at the respective color layers (R, G, B) 109, 110, 111 so as to prevent the image-sticking defect, in the third embodiment the different fieldthrough $\Delta V_P$ at the respective color layers (R, G, B) 109, 110, 111 is corrected by means of drive voltage to prevent the image-sticking defect. In the horizontal electric field drive type, the transparent electrode on the color filter forming substrate 102 in TN type does not exist, therefore the electric flux line generated by the pixel electrode 104 and common electrode 105 penetrates through the inside of the color layers (R, G, B) 109, 110, 111. Namely, the fieldthrough $\Delta V_P$ is a function of color-layer capacitance $C_{COLOR}$, which is given by:

$$\Delta V_P = -\frac{C_{GS}}{C_{GS} + C_{LC} + C_{COLOR}} \cdot (V_{ON} - V_{OFF}) \qquad [3]$$

Figure 7:
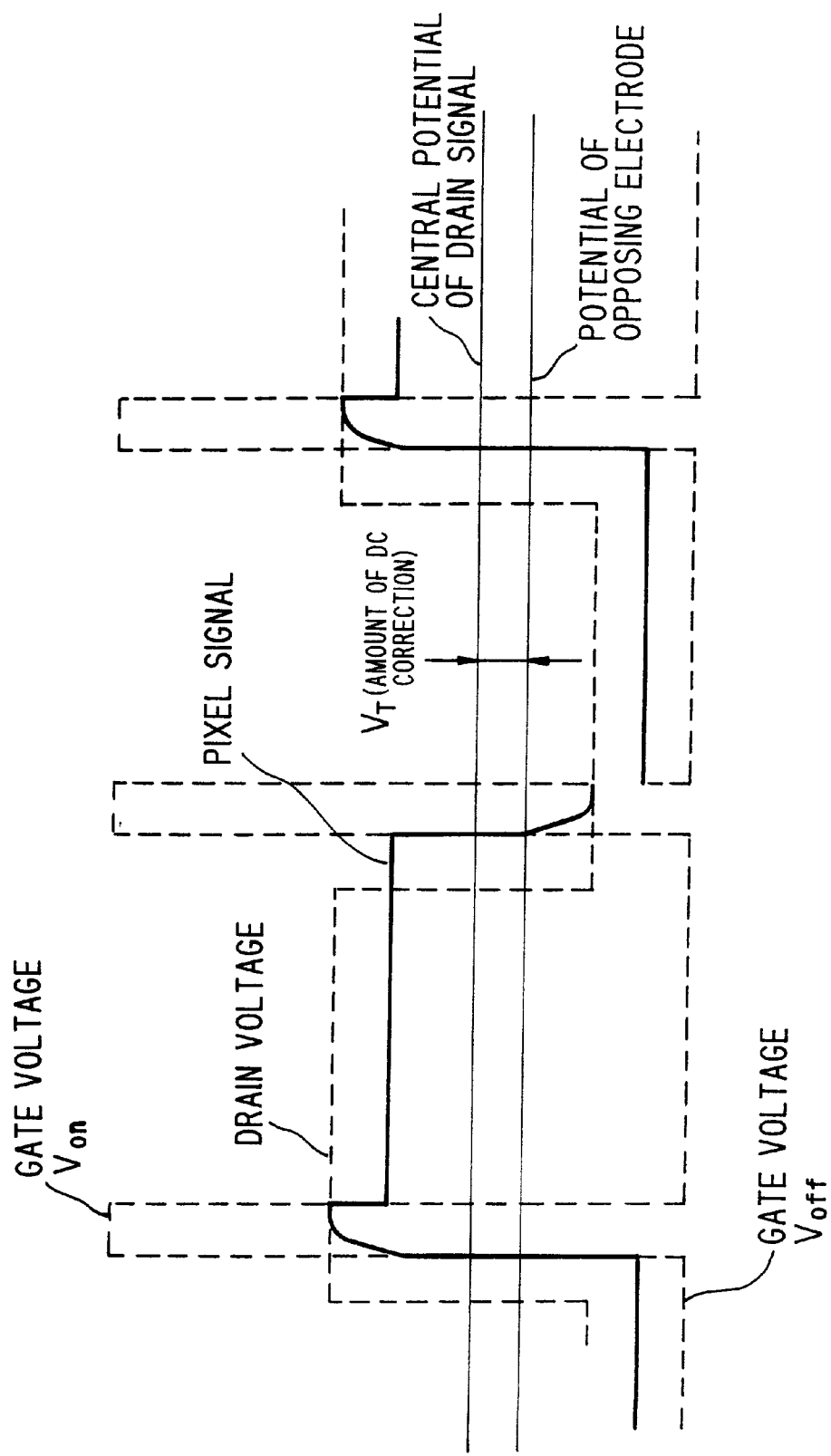
FIG. 7 is an illustrative diagram showing generated fieldthrough and correction amount of drain voltage.

Now, provided that the specific dielectric constants ε of the respective color layers (R, G, B) 109, 110, 111 are R=3.4, G=3.6 and B=4.2 and the thickness of the color layers (R, G, B) 109, 110, 111 is all 1.5 μm, the fieldthrough $\Delta V_P$ generated at the respective color layers (R, G, B) 109, 110, 111 given by expression 3 is different each other, and the amount of correction, $V_T$ shown in FIG. 7 differs in the color layers (R, G, B) 109, 110, 111 each.

Figure 8:
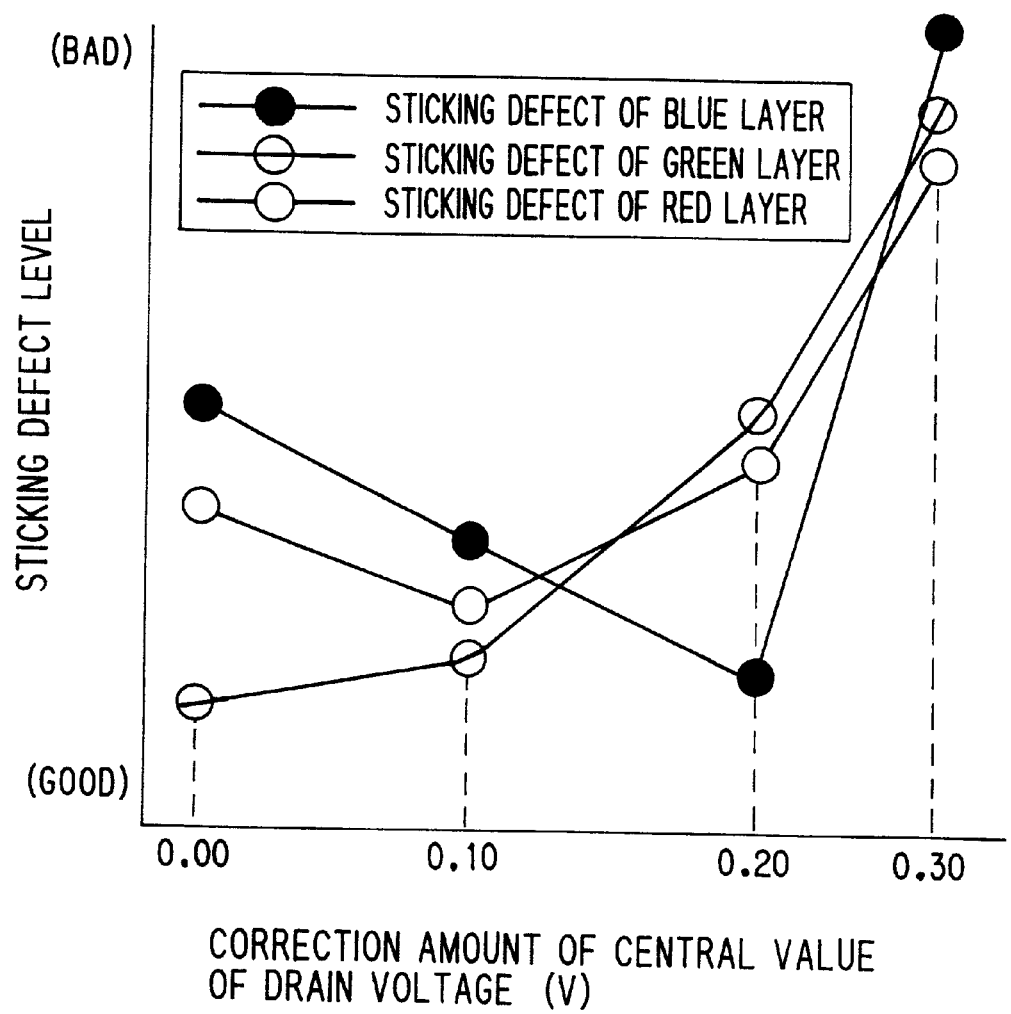
FIG. 8 is a graph showing the relationship between the correction amount of drain voltage at respective color layers of the color filter in the third embodiment and the image-sticking defect level.

FIG. 8 shows the relationship between amount drain correction and image-sticking defect level at the respective color layers (R, G, B) 109, 110, 111 in the case where a LC display device is built using this color filter. From this, it will be understood that the correction amount of drain voltages $V_1$, $V_2$, $V_3$ to give the lowest image-sticking defect level is different each other. Namely, it is found that when DC component of 0V to the color layer (R) 109, 0.1V to the color layer (G) 110, and 0.2V to the color layer (B) 111, as amount of correction, is given to shift the central value $V_D$ of the drain voltages $V_1$, $V_2$, $V_3$ each, the image-sticking defect can be best improved. Accordingly, the relationship among $V_{BLUE}$, $V_{RED}$ and $V_{GREEN}$ which are the central values of drain voltage of blue, red and green, respectively is given by:

$$V_{BLUE}(V) = V_{RED}(V) - 0.2(V) = V_{GREEN} - 0.1(V) \qquad [4]$$

Also, in the respective color layers (R, G, B) 109, 110, 111 prepared as shown in Table 1, the resistivity Y (Ω·cm) of the color layers (R, G, B) 109, 110, 111 is laid along the abscissa axis, and the correction amount X(V) of central value of drain voltage in each of the color layers (R, G, B) 109, 110, 111 most effective to prevent the image-sticking defect is laid along the ordinate axis. Found in this case is the relationship between X and Y given by:

$$Y = C'X + D \quad [5]$$

where C and D are in the range of:

$$3 \times 10^{11} < C < 7 \times 10^{11}$$

$$0.5 \times 10^{11} < D < 1.0 \times 10^{11}$$

and typically, $$C = 5 \times 10^{11}$$

$$D = 0.8 \times 10^{11}$$

Accordingly, by the combination of drive voltage and color layers (R, G, B) 109, 110, 111 to satisfy expression 4 or 5, the image-sticking defect can be improved.

Also in the fourth embodiment where the amplitude of the drain voltages $V_1$, $V_2$, $V_3$ 109, 110, 111 of the color layers (R, G, B) 109, 110, 111, respectively is varied, to equalize the fieldthrough $\Delta V_P$ generated at the respective color layers (R, G, B) 109, 110, 111 is apparently effective.

Advantages of the Invention

As explained above, according to the invention, by equalizing the fieldthrough at the respective color layers (R, G, B), the image-sticking defect can be significantly improved.

Also, according to the invention, by equalizing the product of dielectric constant $\epsilon$ and thickness H in each of the color layers (R, G, B) in the color filter, the image-sticking defect can be significantly improved.

Also, according to the invention, by varying the TFT-side holding capacitance to each of the color layers so as to compensate a difference in the sum of color-layer capacitance and LC capacitance at each of the color layers (R, G, B) in the color filter, the image-sticking defect can be significantly improved.

Also, according to the invention, by providing the circuit to send electrical signal to each of the color layers (R, G, B) in the color filter and making a difference in the central value of drain signal voltages for the respective color layers, the image-sticking defect can be significantly improved.

Although the invention has been described with respect to specific embodiment for complete and clear disclosure, the appended claims are not to be thus limited but are to be construed as embodying all modifications and alternative constructions that may be occurred to one skilled in the art which fairly fall while the basic teaching here is set forth.

What is claimed is:

1. An active matrix liquid-crystal display device, comprising:

an electrode-formed substrate comprising a drain signal electrode, a gate signal electrode, a pixel electrode and a common electrode that forms a pixel unit, and an active element;

a color-filter-formed substrate having no electrode and comprising a color filter layer of red (R), green (G) and blue (B) for allowing color light to be transmitted therethrough; and a liquid-crystal layer disposed between said electrode-formed substrate and said color-filter-formed substrate;

wherein a plurality of pixel electrodes and common electrodes are disposed alternately in parallel at predetermined intervals in insulating film;

an electric field substantially parallel to said electrode-formed substrate and said color-filter-formed substrate is applied to said liquid-crystal layer by applying an alternating-current voltage between said pixel electrode and said common electrode, said pixel electrode and said common electrode are connected to an external control means by which the applied electric field is arbitrarily controlled according to a display pattern, two orientation films are formed directly on or disposed in said insulating film on said electrode-formed substrate and said color-filter-formed substrate, respectively, said two orientation films are disposed opposite from each other and with a predetermined clearance by a panel spacer, nematic liquid crystal fills said clearance while being anti-parallel oriented, a circuit to send an electrical signal to each of respective color layers (R, G, B) of said color filter layer is provided to make a difference in a central value of drain signal voltages for said respective color layers (R, G, B), and said difference in said central value of drain signal voltages is set to satisfy the relation:

$$V_{BLUE}(V) = V_{RED}(V) - 0.2(V) = V_{GREEN} - 0.1(V),$$

where $V_{BLUE}$, $V_{RED}$ and $V_{GREEN}$ are central values of drain voltages blue, red and green, respectively.

2. An active matrix liquid-crystal display device, comprising:

an electrode-formed substrate comprising a drain signal electrode, a gate signal electrode, a pixel electrode and a common electrode that forms a pixel unit, and an active element;

a color-filter-formed substrate having no electrode and comprising a color filter layer of red (R), green (G) and blue (B) for allowing color light to be transmitted therethrough; and a liquid-crystal layer disposed between said electrode-formed substrate and said color-filter-formed substrate, wherein a plurality of pixel electrodes and common electrodes are disposed alternately in parallel at predetermined intervals in insulating film, an electric field substantially parallel to said electrode-formed substrate and said color-filter-formed substrate is applied to said liquid-crystal layer by applying an alternating-current voltage between said pixel electrode and said common electrode, said pixel electrode and said common electrode are connected to an external control means by which the applied electric field is arbitrarily controlled according to a display pattern, two orientation films are formed directly on or disposed in said insulating film on said electrode-formed substrate and said color-filter-formed substrate, respectively, said two orientation films are disposed opposite from each other and with a predetermined clearance by a panel spacer, nematic liquid crystal fills said clearance while being anti-parallel oriented, a circuit to send an electrical signal to each of said respective color layers (R, G, B) of said color filter layer is provided to make a difference in a central value of drain signal voltages for said respective color layers (R, G, B), and resistivity Y (Ωcm) of said respective color layers (R, G, B), and difference X (V) between the central value of the drain signal voltage at the red color layer and the central value of the drain signal voltage at each of said respective color layers (R, G, B) is set to satisfy the relation:

$$Y=CX+D,$$

where C and D are in the range of:

$$3\times10^{11}<C<7\times10^{11}$$

$$0.5\times10^{11}<D<1.0\times10^{11}$$

and preferably, $$C=5\times10^{11}$$

$$D=0.8\times10^{11}.$$

* * * * *

UNITED STATES PATENT AND TRADEMARK OFFICE
CERTIFICATE OF CORRECTION

| | | |
|---|---|---|
| PATENT NO. | : 6,278,427 B1 | Page 1 of 1 |
| APPLICATION NO. | : 09/201883 | |
| DATED | : August 21, 2001 | |
| INVENTOR(S) | : Kimikazu Matsumoto, Shinichi Nishida and Hideo Shibahara | |

It is certified that error appears in the above-identified patent and that said Letters Patent is hereby corrected as shown below:

Title Page;

Under REFERENCES CITED at (56):

Add the following references:
JP 06-027443
JP 04-194823

Signed and Sealed this
Ninth Day of August, 2011

David J. Kappos
*Director of the United States Patent and Trademark Office*